Jan. 27, 1959 R. WEBER 2,870,575
PLANT PROPAGATING DEVICES
Filed Aug. 2, 1954

INVENTOR.
ROBERT WEBER
BY

United States Patent Office 2,870,575
Patented Jan. 27, 1959

2,870,575

PLANT PROPAGATING DEVICES

Robert Weber, Lausanne, Switzerland

Application August 2, 1954, Serial No. 447,192

Claims priority, application Switzerland July 31, 1953

1 Claim. (Cl. 47—37)

It is known to provide plant seedlings or cuttings (hereinafter referred to as "seedlings") with clods of earth in order to ensure that, on being transplanted, they will grow more rapidly and will not suffer any loss in growth. The formation of such clods of earth for plant seedlings has already been tried and carried out in various ways. For example, it is known to press flower-pot like structures from humus or from earth mixed with dung, which are then filled with rearing earth and in each of which a plant seedling is cultivated. A hot-bed, a garden-bed or a compartment of a green-house is charged with such flower-pot like structures. However, these known flower-pot like structures of humus or of earth mixed with dung are not well suited for transport and storing because they very easily crumble, especially in the dried condition. For the production of these structures of humus or of earth mixed with dung, a press is necessary which, if it is to be efficient, is rather expensive. Owing to their bad keeping quality, these structures have to be produced just at the time when the gardener or planter is in any case overburdened with other seasonal work. It is further found that, after some time, when the seedlings are to be sold or transplanted, such structures of humus or the like no longer have practically any strength, so that they easily disintegrate with the clods of earth which they contain.

There have also already been proposed devices for shaping clods of earth for plant seedlings, which devices consist of corrugated plates which are intended for being joined in such a manner, in a hot-bed box or a compartment of a green-house, that they form a honeycomb like cellular structure on to which the rearing earth is poured and pressed, the bottoms of the hot-bed or green-house compartment, respectively, forming a base for the earth. The clods of earth formed in the individual cells are then sown with seedlings or have cuttings inserted in them. These devices have, in general, been approved. However, the seedlings provided with clods of earth cannot be arbitrarily taken out of the hot-bed box or green-house compartment but, after removing a particular corrugated plate, a row of seedlings provided with clods of earth is released and these released clods of earth together with seedlings must be taken out of the hot-bed box or green-house compartment before a further corrugated plate is removed. No guarantee is afforded that the clods of earth remain with a sufficient size on being lifted out of the hot-bed box or green-house compartment.

All these disadvantages can be obviated by the present invention.

The subject matter of the present invention is a propagating device for plant seedlings which comprises an assemblable and disassemblable structure consisting of a plurality of coacting compartment-like U-shaped bodies for receiving rearing earth and seedlings, each of said bodies being formed of a U-shaped strip which is bent at right angles and which is made of a material that is not attacked by air or water or by acids and bases occurring in the rearing earth or manures and which is intended to receive a clod of earth.

Two examples of embodiment of the subject matter of the invention are represented and their use illustrated in the accompanying drawings, of which Fig. 1 is a diagrammatic representation of the first embodiment;

Figure 1:
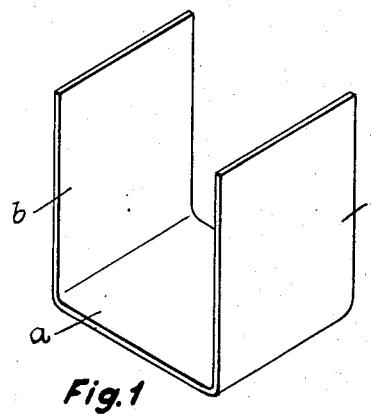
Figure 2:
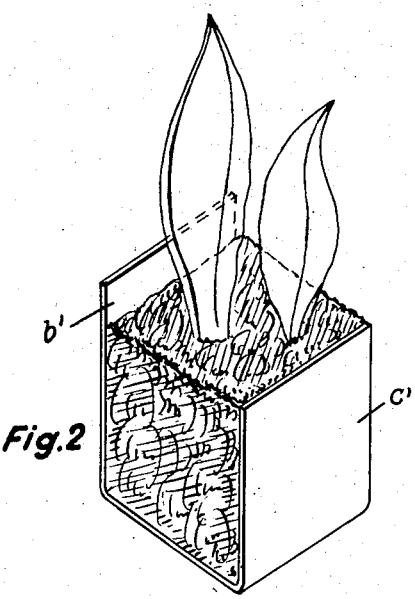
Fig. 2 is a diagrammatic representation of the second embodiment.

Each of the U-shaped bodies comprising an assemblable and disassemblable structure of the propagating device for plant seedlings is shown in Fig. 1 and consists of a U-shaped strip, bent at right angles, of a material having such property so that said material will not be attacked by air or water or by the acids and other corrosive substances that occur in rearing earth and manures, for example galvanised iron plate and synthetic plastic. The middle part of this U-shaped strip forms a bottom *a* and its side parts, which are of equal length and width and are bent off at right angles, form two side walls *b* and *c* which are coextensive to and opposite each other. Another form of a U-shaped body comprising a similar assemblable and disassemblable structure of the propagating device for plant seedlings is shown in Fig. 2. It differs from each U-shaped body of the propagating device shown in Fig. 1 in that the side wall *b'* is longer than the side wall *c'*.

Figure 3:
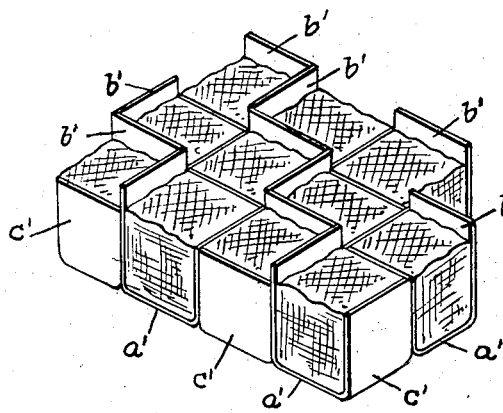
Fig. 3 is a diagrammatic representation of a part of a hot-bed box or green-house compartment with the propagating U-shaped bodies for plant seedlings shown in Fig. 2.
Figure 4:
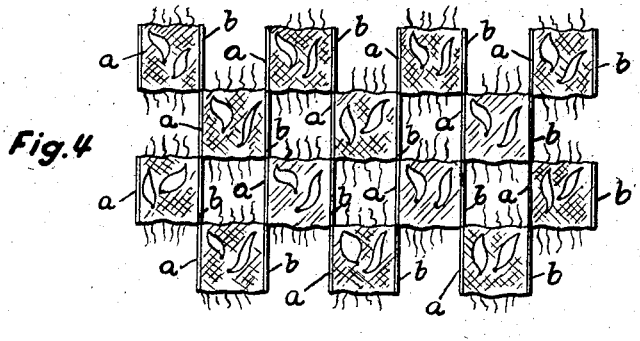
Fig. 4 is a plan of a part of a hot-bed box or of a green-house compartment with propagating U-shaped bodies for plant seedlings with the plant seedlings in an advanced stage of growth.

A hot-bed box or a green-house compartment is completely occupied by propagating devices for plant seedlings, adjacent propagating devices being always rotated through 90° in relation to one another in such a manner that there is located or fits at the open sides of each propagating U-shaped body a side wall *b* or *c* of an adjacent propagating U-shaped body. In this way, there are formed four-sided cells which are entirely closed on all sides but are open at the top and which completely fill the whole space in the hot-bed box or green-house compartment. The bottoms of the adjacent U-shaped bodies thus form one substantially continuous base of the assembled structure without requiring a supporting box therefor. Rearing earth is then poured in and pressed, so that there is formed in each cell a clod of earth which can be sown with seedlings or have cuttings inserted in it. Excess of water can then readily flow away through the joints between adjacent U-shaped bodies. If the growth of the seedlings has advanced to such an extent that they can be sold or transplanted, the gardener or planter can, as he wishes, lift any propagating U-shaped body, together with the clod of earth and seedling therein, out of the hot-bed box or greenhouse compartment. Thus, it is possible for a buyer to pick out the seedings which please him best. The removal of individual U-shaped bodies from the assembled structure may be accomplished without disturbing the remainder of the assembled bodies. The lifting out of individual propagating U-shaped bodies with clods of earth and seedlings therein is considerably facilitated when, as shown in Fig. 3, the propagating U-shaped bodies shown in Fig. 2 are employed, since, in that case, the longer side walls *b'* project above the rearing earth and can easily be grasped. The free spaces which result from the lifting out of individual propagating U-shaped bodies may be left empty; however, they may, with advantage, be refilled with rearing earth in order to prevent the clods of earth in adjacent cells, which are open towards the resulting space, from collapsing. It is also possible for the gardener or planter, in the case of seedlings that are to be grown to a larger size, to provide space by removing every alternate propagating U-shaped body from the hot-bed box, as shown in Fig. 4, and filling the resulting free spaces with rearing earth. The roots of the seedlings remaining in the assembly can then spread out towards the open sides of the propagating U-shaped bodies.

For seedlings which take root deeply, a propagating U-shaped body according to the invention may be used in such a manner that it surrounds the clod of earth on three sides but leaves the bottom free. The clod of earth is, in this case, held clamped between the two outer parts of the propagating U-shaped body.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is.

What I claim is:

A plant propagating device comprising an assembly of a plurality of coacting compartment-like U-shaped bodies for receiving rearing earth and seedlings, each of said U-shaped bodies being provided with opposite upright side walls, a bottom wall intermediate said side walls, one of said side walls being longer than and extending above the other side wall to form a visible separator and handle, the width of both said side walls and of said bottom wall being equal throughout their extent, the distance between said upright side walls corresponding to the width of each of said side walls, said U-shaped bodies being arranged adjacent one another in a plurality of rows, said rows of said bodies being arranged in parallel abutting relationship, each of said U-shaped bodies in each of said rows extending with respect to each adjacent U-shaped body so that one side wall of one of said bodies extends normal to one side wall of each adjacent body and in abutting relation to both side walls of an adjacent body and closes the space between the side walls of the latter, the bottoms of said respective U-shaped bodies lying in the same plane, whereby any of said U-shaped bodies may each be removed from said assembly without affecting the position of any of its adjacent U-shaped bodies and without disturbing the roots or soil of a plant in such adjacent U-shaped body.

References Cited in the file of this patent

UNITED STATES PATENTS

| | | |
|---|---|---|
| 416,898 | Broadhead | Dec. 10, 1889 |
| 894,211 | Kaump | July 28, 1908 |

FOREIGN PATENTS

| | | |
|---|---|---|
| 6,729 | Great Britain | Sept. 18, 1913 |